(12) United States Patent
Kaneda

(10) Patent No.: US 12,181,729 B2
(45) Date of Patent: Dec. 31, 2024

(54) IMAGING OPTICAL SYSTEM AND IMAGING APPARATUS

(71) Applicant: SONY CORPORATION, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 16/982,455

(22) PCT Filed: Mar. 4, 2019

(86) PCT No.: PCT/JP2019/008390
§ 371 (c)(1),
(2) Date: Sep. 18, 2020

(87) PCT Pub. No.: WO2019/188018
PCT Pub. Date: Oct. 3, 2019

(65) Prior Publication Data
US 2021/0055507 A1    Feb. 25, 2021

(30) Foreign Application Priority Data

Mar. 26, 2018 (JP) .................. 2018-058370

(51) Int. Cl.
*G02B 13/18* (2006.01)
*G02B 9/12* (2006.01)
(Continued)

(52) U.S. Cl.
CPC .......... *G02B 9/12* (2013.01); *G02B 13/0035* (2013.01); *G02B 13/18* (2013.01); *G02B 13/22* (2013.01)

(58) Field of Classification Search
CPC ... G02B 9/00; G02B 9/12; G02B 9/16; G02B 9/32; G02B 13/00; G02B 13/0005;
(Continued)

(56) References Cited

U.S. PATENT DOCUMENTS 6,614,539 B1   9/2003 Shimizu
6,624,953 B2 * 9/2003 Noda .................. G02B 13/24
                                              359/716
(Continued)

FOREIGN PATENT DOCUMENTS

CN   203084277 U   7/2013
CN   103984209     8/2014
(Continued)

OTHER PUBLICATIONS

International Search Report prepared by the Japan Patent Office on May 16, 2019, for International Application No. PCT/JP2019/008390.

*Primary Examiner* — Thong Q Nguyen
(74) *Attorney, Agent, or Firm* — Sheridan Ross PC

(57) ABSTRACT

An imaging optical system according to the present disclosure includes a first lens, a second lens, and a third lens. The first lens includes an image-plane-side lens surface having an aspherical shape with an inflection point. The second lens has a meniscus shape including a concave surface toward object side. The third lens has a meniscus shape including a concave surface toward image plane side. The first lens, the second lens, and the third lens are disposed in order from the object side toward the image plane side. The imaging optical system is provided as a bi-telecentric optical system.

11 Claims, 11 Drawing Sheets

(51) Int. Cl.
*G02B 13/00* (2006.01)
*G02B 13/22* (2006.01)

(58) Field of Classification Search
CPC .......... G02B 13/001; G02B 13/0015;
G02B 13/002; G02B 13/0035; G02B
13/0055; G02B 13/0065; G02B 13/008;
G02B 13/0095; G02B 13/14; G02B
13/18; G02B 13/22; G02B 13/24; G02B
13/26
USPC ........ 359/355–356, 649–651, 663, 716, 735,
359/738–740, 784, 792, 754
See application file for complete search history.

(56) References Cited

U.S. PATENT DOCUMENTS

| | | | | |
|---|---|---|---|---|
| 6,927,925 | B2 * | 8/2005 | Amanai | G02B 13/0095 |
| | | | | 359/740 |
| 7,196,855 | B2 * | 3/2007 | Yamaguchi | G02B 13/18 |
| | | | | 359/716 |
| 7,897,986 | B2 * | 3/2011 | Liu | G02B 3/0056 |
| | | | | 257/431 |
| 8,094,231 | B2 * | 1/2012 | Tsai | G02B 27/0025 |
| | | | | 348/340 |
| 9,462,237 | B2 * | 10/2016 | Koshiba | H04N 25/585 |
| 9,897,779 | B2 * | 2/2018 | Mao | H04N 23/50 |
| 2002/0003669 | A1 | 1/2002 | Kedar et al. | |
| 2004/0009415 | A1 | 1/2004 | Shigematsu | |
| 2006/0056051 | A1 | 3/2006 | Hakko et al. | |
| 2008/0212207 | A1 | 9/2008 | Taniyama | |
| 2009/0231734 | A1 | 9/2009 | Cho | |
| 2013/0222927 | A1 * | 8/2013 | Kubota | G02B 13/0035 |
| | | | | 359/716 |
| 2014/0247510 | A1 * | 9/2014 | Kwon | G02B 13/0035 |
| | | | | 359/716 |
| 2015/0077618 | A1 * | 3/2015 | Ueno | H04N 23/57 |
| | | | | 348/340 |
| 2016/0196005 | A1 | 7/2016 | Kaneda | |
| 2016/0223789 | A1 * | 8/2016 | Liu | G02B 13/0035 |
| 2017/0153770 | A1 | 6/2017 | Kaneda | |
| 2018/0120536 | A1 * | 5/2018 | Chang | G02B 13/0035 |
| 2018/0348488 | A1 | 12/2018 | Nishida | |

FOREIGN PATENT DOCUMENTS

| | | | |
|---|---|---|---|
| JP | 2002-268001 | | 9/2002 |
| JP | 2010008559 | A | 1/2010 |
| JP | 2011028100 | A | 2/2011 |
| JP | 2015-064550 | | 4/2015 |
| JP | 2020522024 | A | 7/2020 |
| KR | 10-2012-0094311 | * | 8/2012 |
| WO | WO 2017/082287 | | 5/2017 |

* cited by examiner

IMAGING OPTICAL SYSTEM AND IMAGING APPARATUS

CROSS REFERENCE TO RELATED APPLICATIONS

This application is a national stage application under 35 U.S.C. 371 and claims the benefit of PCT Application No. PCT/JP2019/008390 having an international filing date of 4 Mar. 2019, which designated the United States, which PCT application claimed the benefit of Japanese Patent Application No. 2018-058370 filed 26 Mar. 2018, the entire disclosures of each of which are incorporated herein by reference.

TECHNICAL FIELD

The present disclosure relates to an imaging optical system and an imaging apparatus that relay, for example, a primary image-formation image formed on object side onto an imaging surface of an imaging device as a secondary image-formation image.

BACKGROUND ART

There is a relay optical system that relays, as a secondary image-formation image (a secondary image-formation image), an object image (a primary image-formation image) formed by primary image formation. Regarding the relay optical system, an optical path length is simply adjusted in some cases, and image relay is performed by means of a combination of a plurality of lenses in order to decrease image magnification, etc. in other cases. Meanwhile, for example, PTL 1 proposes a projector with a touch detection (position detection) function that allows for operation of a projected image as on a touch panel. Further, PTL 1 also proposes a relay optical system including two lens groups as an imaging optical system adapted to perform object-position detection and imaging.

CITATION LIST

Patent Literature

PTL 1: Japanese Unexamined Patent Application Publication No. 2015-64550 (FIG. 18)

SUMMARY OF THE INVENTION

In order to simply detect a position of an object, an imaging optical system including a two-lens relay optical system can be sufficient in terms of performance in some cases. However, in a case where it is desired to perform imaging of a detected object at a higher resolution, the two-lens configuration can be insufficient in terms of image formation performance.

It is desirable to provide an imaging optical system and an imaging apparatus that are small in size and superior in image formation performance.

An imaging optical system according to one embodiment of the present disclosure includes a first lens, a second lens, and a third lens. The first lens includes an image-plane-side lens surface having an aspherical shape with an inflection point. The second lens has a meniscus shape including a concave surface toward object side. The third lens has a meniscus shape including a concave surface toward image plane side. The first lens, the second lens, and the third lens are disposed in order from the object side toward the image plane side. The imaging optical system is provided as a bi-telecentric optical system.

An imaging optical apparatus according to one embodiment of the present disclosure includes an imaging optical system, and an imaging device that outputs an imaging signal based on an optical image formed by the imaging optical system. The imaging optical system includes a first lens, a second lens, and a third lens. The first lens includes an image-plane-side lens surface having an aspherical shape with an inflection point. The second lens has a meniscus shape including a concave surface toward object side. The third lens has a meniscus shape including a concave surface toward image plane side. The first lens, the second lens, and the third lens are disposed in order from the object side toward the image plane side. The imaging optical system is provided as a bi-telecentric optical system.

In the imaging optical system or the imaging apparatus according to the embodiments of the present disclosure, a three-lens configuration is provided as a whole, and each lens has an optimized configuration.

MODES FOR CARRYING OUT THE INVENTION

Embodiments of the present disclosure are described below in detail with reference to the drawings. Note that the description is given in the following order.

0. Comparative Example (FIGS. 1 to 3)
1. First Embodiment (FIGS. 4 to 10)
   1.1 Configuration Example of Imaging Optical System
   1.2 Workings and Effects
2. Second Embodiment (FIG. 11)
3. Other Embodiments

0. Comparative Example

Figure 1:
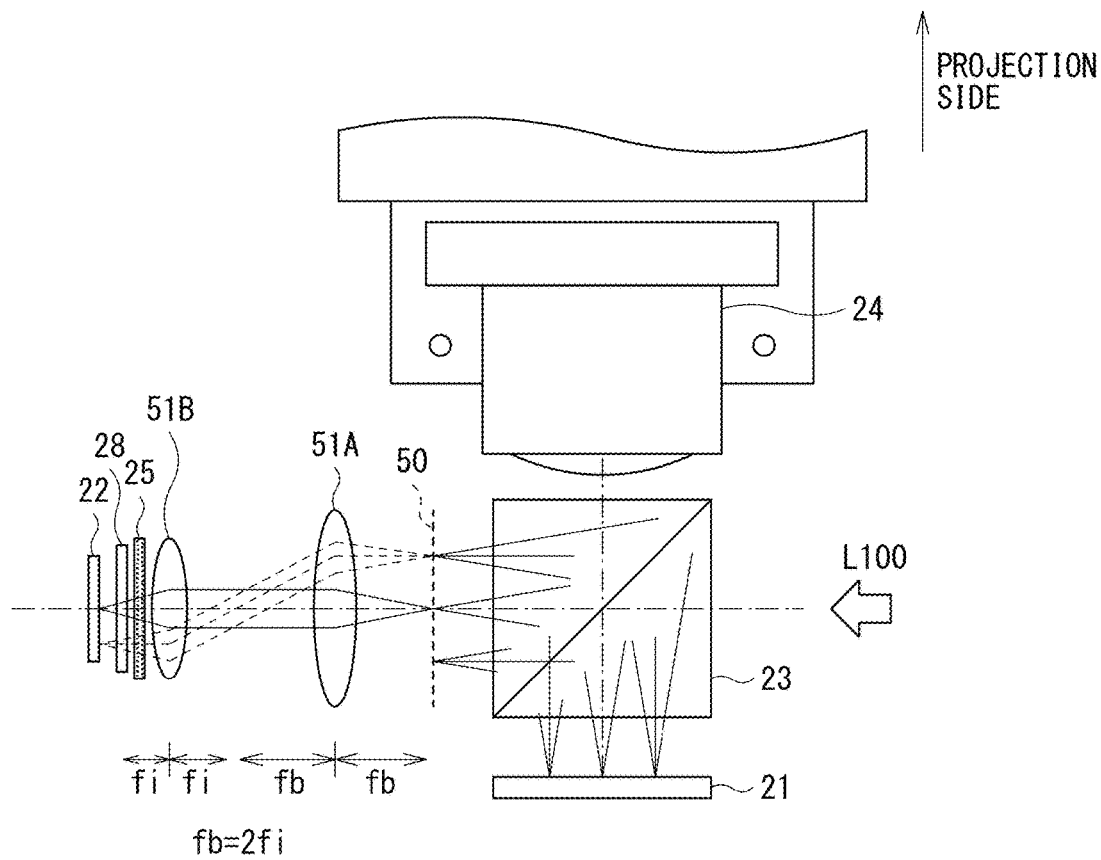
FIG. 1 is an optical-system cross-sectional view of a configuration example of a main part of a projector with a position detection function according to a comparative example.

Overview of Projector to which Imaging Optical System According to Comparative Example is Applied FIG. 1 illustrates a configuration example of a main part of a projector with a position detection function according to a comparative example.

FIG. 18 of PTL 1 (Japanese Unexamined Patent Application Publication No. 2015-64550) discloses the configuration of the projector with the position detection function as illustrated in FIG. 1.

The projector according to this comparative example includes a light valve 21, a polarizing beam splitter 23, and a projection lens 24. Further, the projector according to this comparative example includes an imaging device 22 and an imaging optical system, as an imaging unit adapted to perform object-position detection and imaging. The imaging optical system includes a polarizer 25, a visible-light cut filter 28, a first relay-lens group 51A, and a second relay-lens group 51B.

The light valve 21 is illuminated by illumination light L100 emitted from an unillustrated illumination apparatus via the polarizing beam splitter 23. The light valve 21 is a reflective liquid crystal device such as LCOS (Liquid Crystal On Silicon), for example. The light valve 21 modulates the illumination light L100 on the basis of image data to generate image light. The image light generated by the light valve 21 is projected onto an unillustrated projection surface via the polarizing beam splitter 23 and the projection lens 24.

The projection lens 24 has a function adapted to project an image. In addition thereto, the projection lens 24 has a function as an image formation optical system for position detection. The projection lens 24 receives the image light generated by the light valve 21, and takes in, from a projection surface side, scattered light from a detected object in the vicinity of the projection surface, as detected light. The projection lens 24 forms an image of the detected object on a conjugate plane 50 as a primary image-formation image.

The imaging device 22 includes a solid-state imaging device such as CMOS (Complementary Metal-Oxide Semiconductor) or a CCD (Charge Coupled Device). The imaging device 22 is disposed at a position optically conjugate to the projection surface. Further, the imaging device 22 is disposed at the position optically conjugate to the light valve 21. More specifically, in a case where the light valve 21 is a reflective liquid crystal device, a display surface (a liquid crystal surface) that produces an image and an imaging surface of the imaging device 22 are disposed at respective positions that are optically conjugate to each other. The imaging device 22 receives, via the projection lens 24 and the polarizing beam splitter 23, the scattered light from the detected object as the detected light. The imaging device 22 is configured to perform imaging at least in an imaging region corresponding to a region substantially the same as a projection region on the projection surface.

The imaging optical system is disposed between the optical conjugate plane 50 (a primary image-formation plane) of the light valve 21 and the imaging device 22. The imaging optical system includes the first relay-lens group 51A and the second relay-lens group 51B in order from a side close to the polarizing beam splitter 23. The second relay-lens group 51B has a focal length fi that is smaller than a focal length fb of the first relay-lens group 51A. The first relay-lens group 51A and the second relay-lens group 51B provides a reduction optical system having a reduction magnification β represented by:

$$\beta = fi/fb.$$

Providing the relay optical system and the imaging optical system that serves as the reduction optical system between the conjugate plane 50 and the imaging device 22 allows a position (a secondary image-formation plane) optically conjugate to the light valve 21 to be provided farther than the conjugate plane 50 (the primary image-formation plane). Adopting the reduction optical system as the imaging optical system allows a size of the imaging device 22 to be smaller than that of the light valve 21, while disposing the imaging device 22 at the position (the secondary image-formation plane) optically conjugate to the light valve 21.

For example, under a condition that 2fi=fb is satisfied, further, the first relay-lens group 51A is disposed at a position of fb from the conjugate plane 50 of the light valve 21, the second relay-lens group 51B is disposed at position of fb+fi therefrom, and the imaging device 22 is disposed at a place away from the second relay-lens group 51B by fi. In this case, the position of the imaging device 22 becomes equivalent to the conjugate plane 50, and a reduction optical system of magnification of 0.5 is provided. Accordingly, it becomes possible to perform object detection by means of the small-sized imaging device 22.

Further, in the imaging optical system, a bi-telecentric optical system is provided by the first relay-lens group 51A and the second relay-lens group 51B, having a substantial telecentric property between the first relay-lens group 51A and the polarizing beam splitter 23 and between the second relay-lens group 51B and the imaging device 22.

Problem

The imaging optical system in the projector according to the above-described comparative example is used to detect a position of an object, and is a relay optical system that relays an object image (a primary image-formation image) formed on the conjugate plane 50 by primary image formation, onto the imaging surface of the imaging device 22 as a secondary image-formation image (a secondary image-formation image).

As the projector according to the above-described comparative example, in order to simply detect a position of an object, an image formation performance of a level that forms an image of an imaging spot across some of a plurality of pixels on the imaging surface is sufficient. In terms of performance, a two-lens configuration suffices. However, in order to obtain not only the position of the object but also image information of the detected object at a higher resolution, the two-lens configuration is insufficient in terms of imaging performance. With the two-lens configuration, it is difficult to obtain a sufficient image formation performance in the entire imaging region including not only an on-axial region but also an off-axial region.

Figure 2:
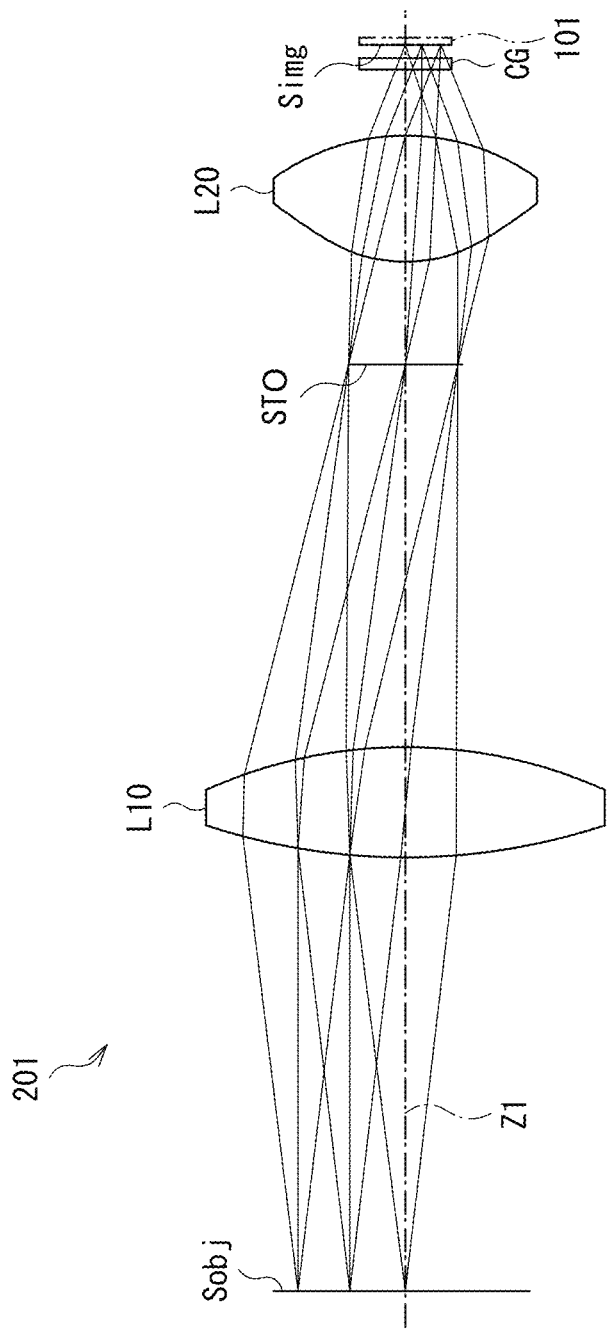
FIG. 2 is an optical-system cross-sectional view of a configuration example of an imaging optical system according to Comparative example 1.

FIG. 2 illustrates a configuration example (Comparative example 1) of an imaging optical system 201 to be applied to a projector according to the above-described comparative example, etc.

The imaging optical system 201 according to Comparative example 1 substantially has a two-lens configuration that includes a first lens L10 and a second lens L20 along an optical axis Z1 in order from object side toward image plane side. The first lens L10 has positive refractive power. The second lens L20 has positive refractive power. The imaging optical system according to Comparative example 1, both the object side and the image plane side are telecentric to provide a bi-telecentric optical system.

Note that, in FIG. 2, STO represents an aperture stop. Sobj represents an object plane (a primary image-formation plane) and Simg represents an image plane (a secondary image-formation plane). An imaging device 101 such as a CCD or a CMOS (corresponding to the imaging device 22 in FIG. 1) is disposed in the vicinity of the image plane Simg. The object plane Sobj corresponds to the conjugate plane 50 in the imaging optical system in FIG. 1. This is similarly applicable to the drawing (FIG. 4) illustrating an imaging optical system 1 according to Example described later and the drawings (FIGS. 7 and 9) illustrating imaging optical systems 202 and 203 respectively according to Comparative examples 2 and 3.

Optical members, for example, various optical filters may be disposed between the object plane Sobj and the first lens L10. Optical members, for example, a cover glass CG for protecting an imaging device or various optical filters may be disposed between the second lens L20 and the image plane Simg.

Figure 3:
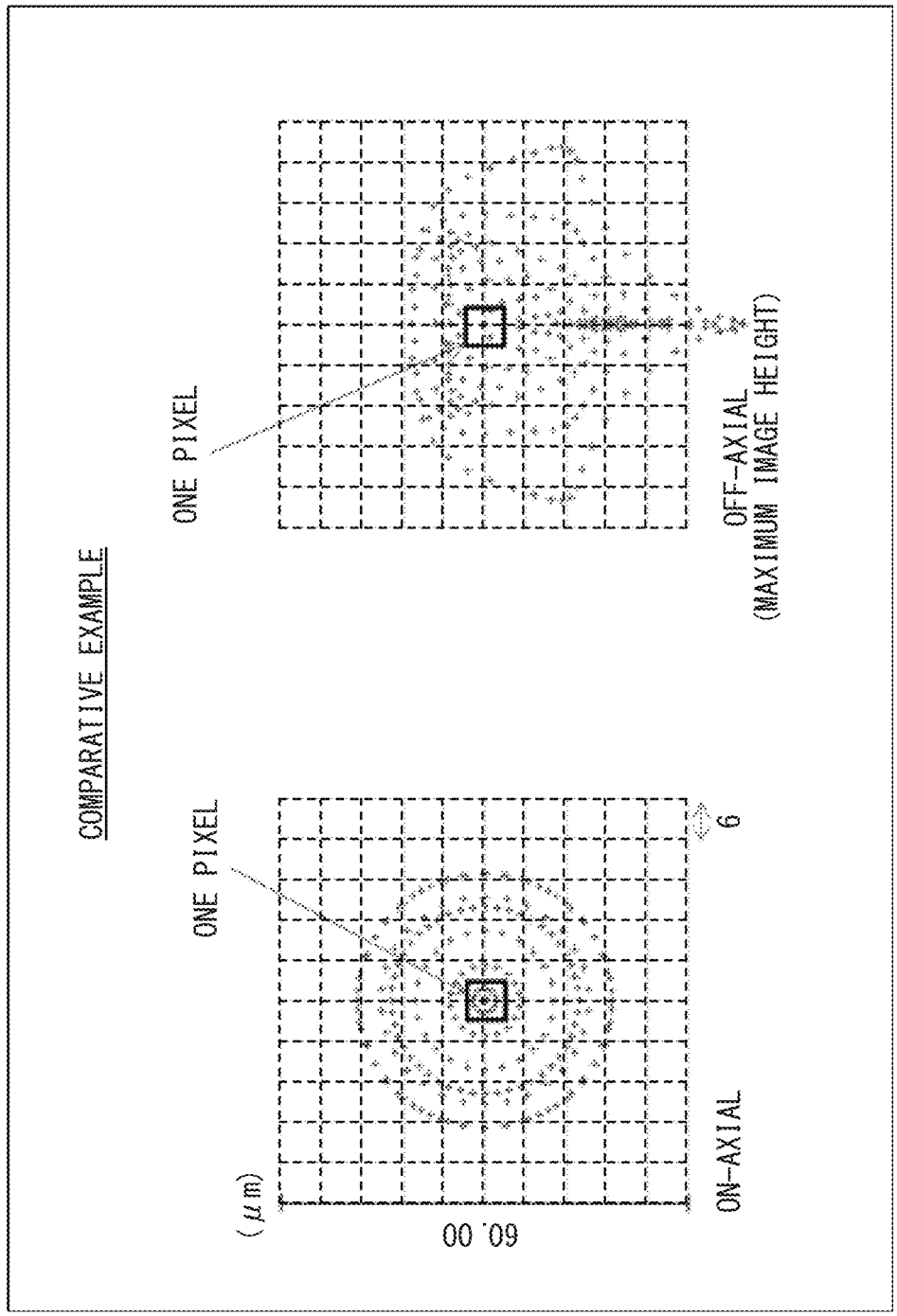
FIG. 3 is a diagram illustrating spot diagrams of the imaging optical system according to Comparative example 1 illustrated in FIG. 2.

FIG. 3 illustrates an on-axial spot diagram and an off-axial (maximum image height) spot diagram of the imaging optical system 201 according to Comparative example 1 illustrated in FIG. 2. The imaging optical system 201 is provided as an optical system that detects infrared light. FIG. 3 illustrates spot diagrams in a case where ray tracing is performed with light having a wavelength of 785 nm.

In a system that acquires image information of a detected object, at least a resolution of about VGA (640×480) is required. For example, in a case of using a ¼-type image sensor as the imaging device 101, an effective pixel region is horizontal 3.6 mm×vertical 2.7 mm, and a size of one pixel is about 5.6 μm. In FIG. 3, a rectangular region indicated by a thick black frame in a center region of each of the on-axial and the off-axial spot diagrams corresponds to one pixel. This is similarly applicable to the spot diagrams (FIG. 5) of the imaging optical system 1 according to Example described later and the spot diagrams (FIGS. 8 and 10) of the imaging optical systems 202 and 203 respectively according to Comparative examples 2 and 3.

As illustrated in FIG. 3, in the imaging optical system 201 according to Comparative example 1, field curvature is not completely solved, preventing an image formation spot from being condensed in one pixel in both the on-axial and the off-axial regions. Accordingly, a sufficient resolution performance is not obtained.

As described above, it is difficult to obtain a sufficient resolution performance with the two-lens configuration. For this reason, in a system that acquires image information of a detected object, an imaging optical system is typically so configured to include five or six lenses that the image plane is uniform from an on-axial region to an off-axial region, thereby obtaining a required resolution performance. However, such a case leads to an increase in configuration size.

Accordingly, it is desired to develop a technique capable of providing an imaging optical system and an imaging apparatus that are small in size and superior in image formation performance, without greatly increasing the number of lenses.

1. First Embodiment

1.1 Configuration Example of Imaging Optical System

Figure 4:
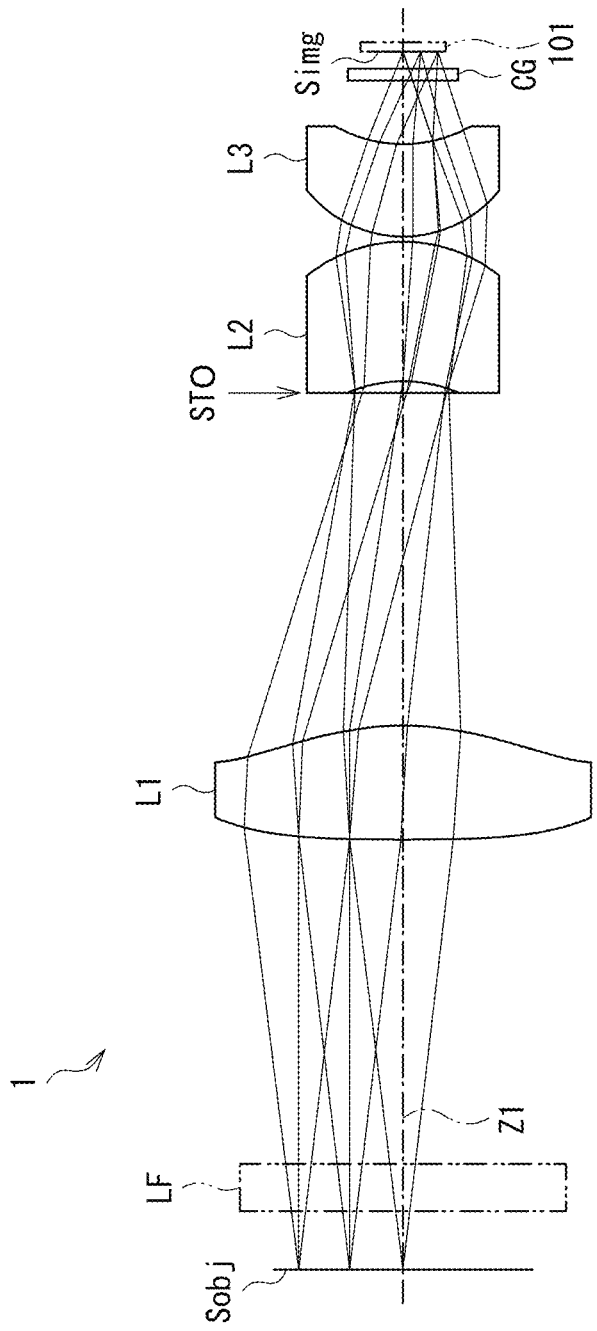
FIG. 4 is an optical-system cross-sectional view of a configuration example of an imaging optical system according to a first embodiment of the present disclosure.

FIG. 4 illustrates a configuration example of the imaging optical system 1 according to a first embodiment of the present disclosure.

The imaging optical system 1 according to the present embodiment is applicable to the projector with the position detection function according to the comparative example described above, and is also applicable to a system requiring an imaging performance with a higher resolution. For example, it is applicable to a projector (FIG. 11) with an image detection function according to a second embodiment described later, etc. The imaging apparatus according to the present embodiment includes at least the imaging optical system 1 and the imaging device 101 that outputs an imaging signal based on an optical image formed by the imaging optical system 1.

The imaging optical system 1 substantially has a three-lens configuration that includes a first lens L1, a second lens L2, and a third lens L3 along an optical axis Z1 in order from object side toward image plane side. The imaging optical system 1 is provided as a bi-telecentric optical system that is telecentric on both the object side and the image plane side.

In the imaging optical system 1, optical members, for example, various optical filters LF, may be disposed between the object plane Sobj and the first lens L1. Optical members, for example, the cover glass CG for protecting the imaging device or various optical filters may be disposed between the third lens L3 and the image plane Simg.

In the imaging optical system 1, the aperture stop STO is disposed in the vicinity of an object-side lens surface of the second lens L2.

In the imaging optical system 1, as with the imaging optical system 201 according to Comparative example 1, the imaging device 101 is disposed on the image plane side. The imaging optical system 1 is provided as a relay optical system that relays the primary image-formation image, formed on the object plane Sobj (the primary image-formation plane), onto the imaging surface (the image plane Simg (the secondary image-formation plane)) of the imaging device 101 as the secondary image-formation image. The primary image-formation image is, for example, an image formed by infrared light. Further, the imaging optical system 1 is provided as a reduction optical system in which the primary image-formation image is reduced to be formed on the image plane Simg (the secondary image-formation plane).

It is preferable that the first lens L1, the second lens L2, and the third lens L3 each have positive refractive power in the vicinity of the optical axis.

The first lens L includes an image-plane-side lens surface having an aspherical shape with an inflection point. It is preferable that the image-plane-side lens surface of the first lens L1 have an aspherical shape that is convex toward the image plane side at a center part and gradually becomes concave in a direction toward a peripheral part. Further, it is preferable that the first lens L1 have an aspherical shape having a thickness that is gradually smaller in a direction toward the peripheral part (Condition 1).

It is desirable that the imaging optical system 1 satisfy $$D(L2) > D(L3)$$

where D(L2) is a thickness of the second lens L2 on the optical axis, and D(L3) is a thickness of the third lens L3 on the optical axis (Condition 2).

It is preferable that the second lens L2 and the third lens L3 have respective meniscus shapes oriented in directions opposite from each other (Condition 3).

It is preferable that the object-side lens surface of the second lens L2 have a curvature in a direction of widening an entering bundle of light rays. It is preferable that the second lens L2 have a meniscus shape including a concave surface toward the object side.

It is preferable that the third lens L3 have a meniscus shape including a concave surface toward the image plane side.

It is desirable that F-number of the imaging optical system 1 be less (brighter) than 6.

Numerical Examples

Table 1 and Table 2 describe lens data of a numerical example in which specific numerical values are applied to the imaging optical system 1 illustrated in FIG. 4.

spacing, on the optical axis, from the i-th surface to the (i+)-th surface. "Ndi" indicates a value of a refractive index with respect to a d-line (a wavelength of 587.6 nm) of a material of an optical element having the i-th surface. "vdi" indicates a value of Abbe's number with respect to the d-line of the material of the optical element having the i-th surface. "Infinity" as the value of "Ri" indicates a planar surface or a virtual plane. "Type" indicates a type of a shape of the lens surface.

The aspherical shape is defined by the following Expression (A), and is represented by a Sag amount Z with a surface vertex as an origin. 1/c (=R) represents a curvature radius of each lens surface. k indicates a conic constant. Z indicates a Sag amount (where a traveling direction of light is positive). r indicates a distance from the optical axis Z1 to the lens surface. $\alpha 1$, $\alpha 2$, and so on each indicate an aspherical surface coefficient of a corresponding order.

In the numerical example described in Table 1 and Table 2, both surfaces (a third surface and a fourth surface) of the first lens L1 and both surfaces (a seventh surface and an eighth surface) of the third lens L3 each have an aspherical shape. A value of k in Expression (A) representing the aspherical shape is described in Table 1. Table 2 describes the aspherical surface coefficients $\alpha 1$, $\alpha 2$, and so on of respective orders. In Table 2, "E-i" represents an exponential expression with a base of 10, that is, "10". For example, "0.12345E-05" represents "0.12345×10$^{-5}$".

TABLE 1

| | | | Example | | | | |
|---|---|---|---|---|---|---|---|
| Si | Type | Ri | Di | Ndi | vdi | k | Element |
| Sobj | | Infinity | 2.00 | | | 0 | |
| 1 | | Infinity | 2.25 | 1.5481 | 45.82 | 0 | LF |
| 2 | | Infinity | 14.35 | | | 0 | |
| 3 | Aspherical | 128.58 | 4.90 | 1.8017 | 40.73 | −20.920 | L1 |
| 4 | Aspherical | −13.31 | 15.00 | | | −5.0855 | |
| 5(STO) | Spherical | −6 | 6.00 (D(L2)) | 1.8467 | 23.78 | 0 | L2 |
| 6 | Spherical | −6.5 | 0.20 | | | 0 | |
| 7 | Aspherical | 4.7 | 4.00 (D(L3)) | 1.8507 | 40.38 | −3.7797 | L3 |
| 8 | Aspherical | 5.19 | 2.80 | | | −6.9191 | |
| 9 | | Infinity | 0.50 | 1.5168 | 64.17 | 0 | CG |
| 10 | | Infinity | 0.70 | | | 0 | |
| Simg | | Infinity | 2.00 | | | 0 | |

TABLE 2

| | Example | | | |
|---|---|---|---|---|
| | Si | | | |
| | 3 | 4 | 7 | 8 |
| α1 | 0 | 0 | 0 | 0 |
| α2 | 0.000134148 | −3.69E−05 | 0.004044382 | 5.98E−03 |
| α3 | 5.44E−07 | 2.07E−06 | −1.67E−04 | −4.00E−04 |
| α4 | 0 | −4.77E−09 | −4.77E−09 | 0 |
| α5 | 0 | 0 | 0 | 0 |
| α6 | 0 | 0 | 0 | 0 |
| α7 | 0 | 0 | 0 | 0 |

Note that meanings, etc. of symbols described in Table 1 and Table 2 are as follows. Note that this is also applicable to lens data of the imaging optical systems 202 and 203 respectively according to Comparative examples 2 and 3 described later.

"Si" indicates the number of the i-th surface, which is numbered so as to sequentially increase from the most object side. "Ri" indicates a value (mm) of a paraxial curvature radius of the i-th surface. "Di" indicates a value (mm) of

[Math. 1]

$$Z = \frac{cr^2}{1 + \sqrt{1 - (1+k)c^2 r^2}} + \alpha 1 r^2 + \alpha 2 r^4 + \alpha 3 r^6 + \alpha 4 r^8 + \alpha 5 r^{10} + \alpha 6 r^{12} + \alpha 7 r^{14} \quad (A)$$

In the numerical example described in Table 1 and Table 2, F-number of the imaging optical system 1 is 4. Further, as described in Table 1, in this numerical example, the thickness D(L2), on the optical axis, of the second lens L2 and the thickness D(L3), on the optical axis, of the third lens L3 satisfy:

$$D(L2) > D(L3).$$

1.2 Workings and Effects

Next, workings and effects of the imaging optical system 1 according to the present embodiment are described.

Note that the effects described herein are merely illustrative and not limitative. Further, other effects may be provided.

According to the imaging optical system 1 of the present embodiment, the three-lens configuration is provided as a whole, and the configuration of each of the lenses is optimized. Accordingly, it is possible to obtain a superior image formation performance with a small size.

Figure 5:
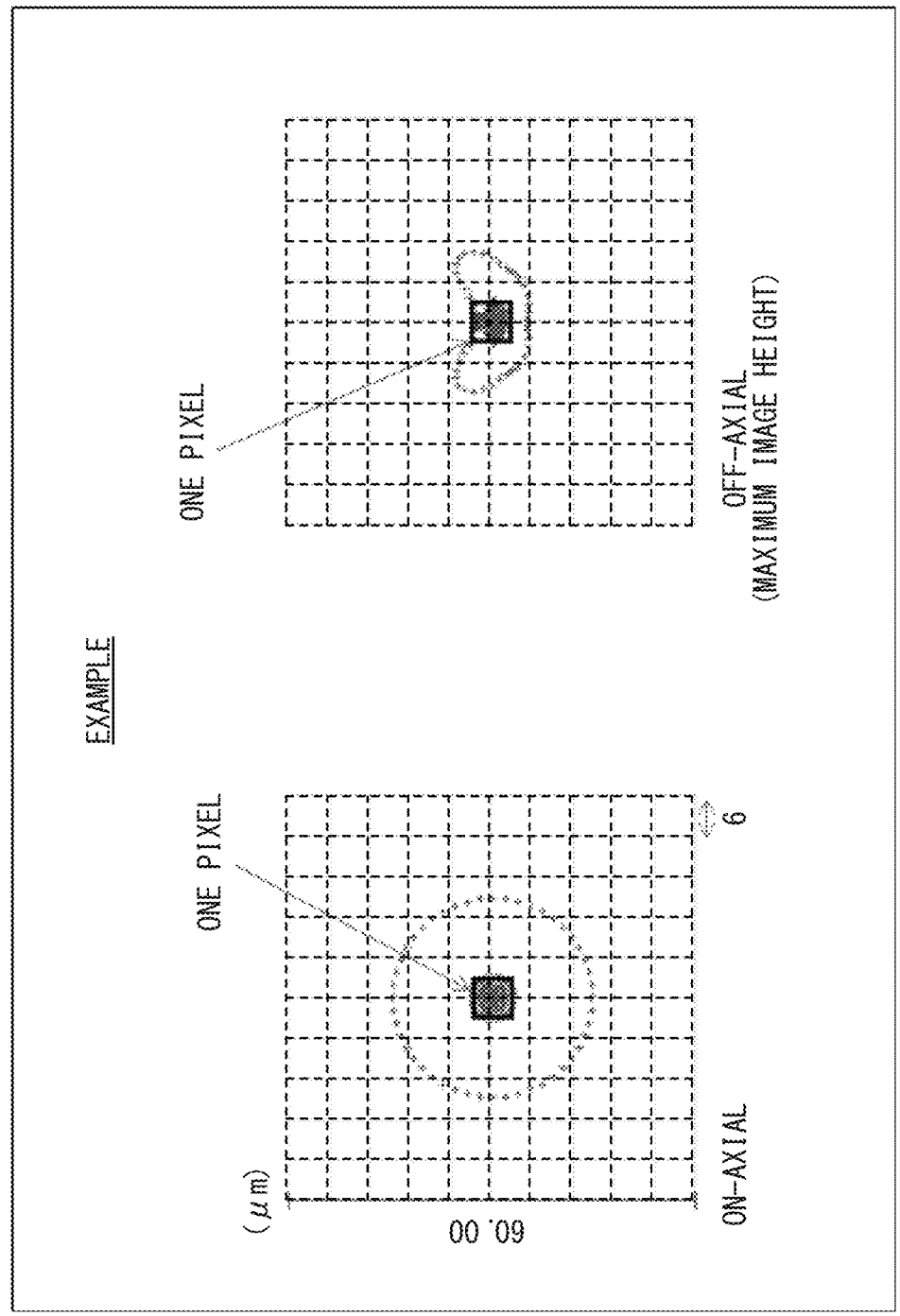
FIG. 5 is a diagram illustrating spot diagrams of an imaging optical system illustrated in FIG. 4.

FIG. 5 illustrates an on-axial spot diagram and an off-axial (maximum image height) spot diagram of the imaging optical system 1. The imaging optical system 1 is provided as an optical system that detects infrared light. FIG. 5 illustrates spot diagrams in a case where ray tracing is performed with light having a wavelength of 785 nm for the numerical example described in Tables 1 and 2.

As can be appreciated from FIG. 5, in the imaging optical system 1, light is allowed to be condensed in one pixel in both the on-axial region and the off-axial region. Accordingly, it is possible to obtain a favorable image formation performance.

(Workings and Effects of Providing Telecentric Optical System)

Figure 6:
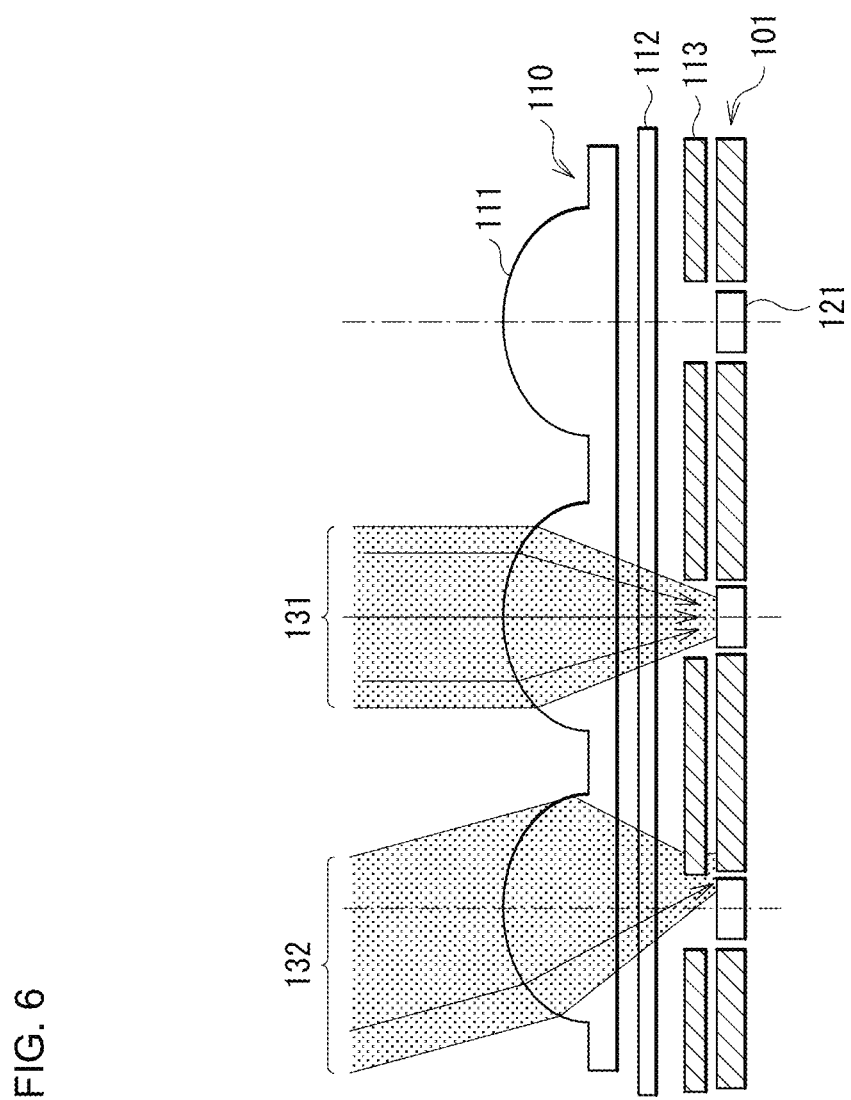
FIG. 6 is a cross-sectional view of a structure example of an imaging device illustrated together with an example of light rays entering the imaging device.

FIG. 6 illustrates a structure example of the imaging device 101 together with an example of light rays entering the imaging device 101.

The imaging optical system 1 is provided as a bi-telecentric image formation system. A telecentric optical system is a system in which a principal ray travels in parallel to the optical axis. Causing the imaging optical system 1 to be bi-telecentric makes it possible to obtain advantageous effects in a case where the imaging device 101 is fabricated on the assumption of the telecentric optical system, for example, as illustrated in FIG. 6.

As illustrated in FIG. 6, the imaging device 101 includes two or more light-receiving elements (photodiodes) 121 corresponding to respective two or more pixels. Disposed on a light entering surface side of the imaging device 101 are, for example, a light-blocking film 113, a filter 112, and a microlens array 110. The microlens array 110 includes two or more microlenses 111.

The light-blocking film 113 blocks light in a part other than a light-receiving region of each of the light-receiving elements 121. The microlenses 111 are each disposed at a position corresponding to each of the light-receiving elements 121.

In the imaging surface of the imaging device 101, the light-receiving region is formed in a limited region. In order to guide light to such a limited light-receiving region, typically, the microlenses 111 corresponding to the light-receiving elements 121 on a one-to-one basis are disposed. Regarding light (parallel light 131) entering in parallel to the optical axis Z, this allows most of the entering light to be condensed toward the light-receiving region by means of the microlenses 111. Thus, an efficient (high-sensitive) light-receiving performance is achieved.

On the other hand, regarding light (oblique entering light 132) entering obliquely with respect to the optical axis Z1, the light is out of the light-receiving region, which decreases efficiency. Further, a bundle of light rays out of the light-receiving region becomes stray light, causing light to leak into adjacent light-receiving elements 121. This causes crosstalk, thus leading to deterioration of image quality. To address such an issue, an imaging device having a structure in which the positions of the light-receiving elements 121 (the pixels) are gradually shifted from the on-axial region toward the off-axial region is under development.

According to the imaging optical system 1 of the present embodiment, providing bi-telecentricity makes it possible to obtain advantageous effects, for example, in a case of application to an imaging device developed specially for a telecentric optical system in which coincidence between a center of the microlens 111 and a center of the light-receiving region is achieved in any part of the on-axial region to the off-axial region, without shifting the pixels.

(Workings and Effects of Aspherical Shape of First Lens L1 (Condition 1))

In the imaging optical system 1 according to the present embodiment, the first lens L1 has the aspherical shape in which a central optical path length and a peripheral optical path length are so adjusted that field curvature is corrected. More specifically, the image-plane-side lens surface of the first lens L1 has an inflection point. In addition, the first lens L1 has the thickness that is gradually smaller in the direction toward the peripheral part.

Figure 7:
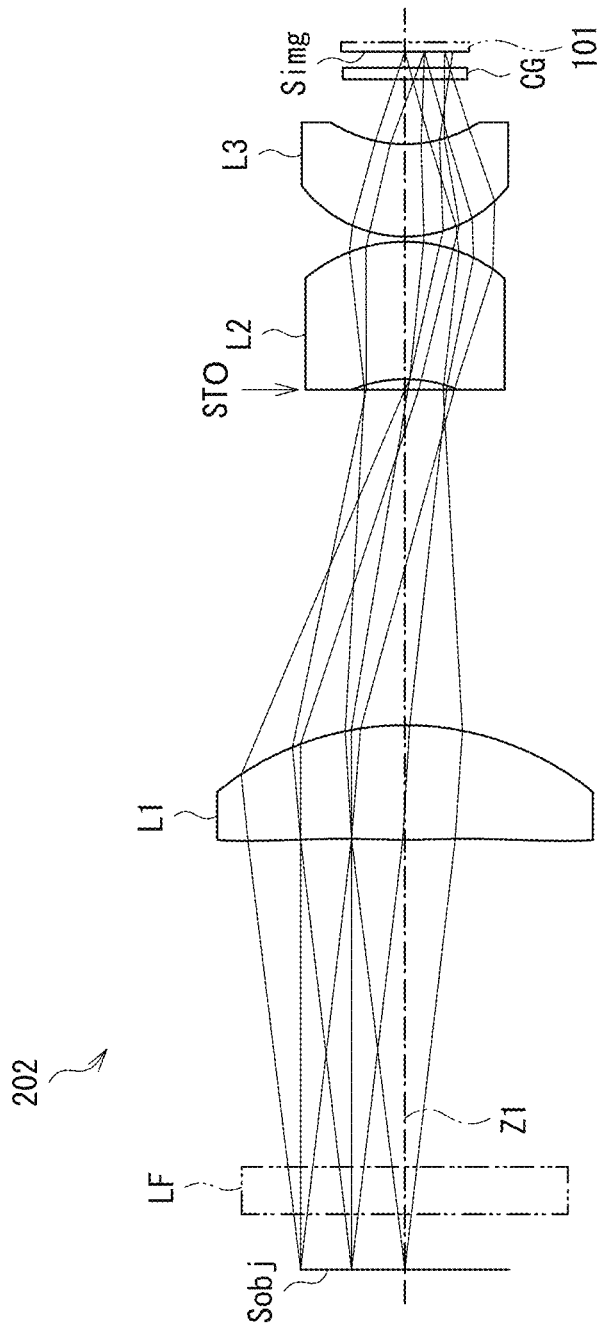
FIG. 7 is an optical-system cross-sectional view of a configuration example of an imaging optical system according to Comparative example 2.
Figure 8:
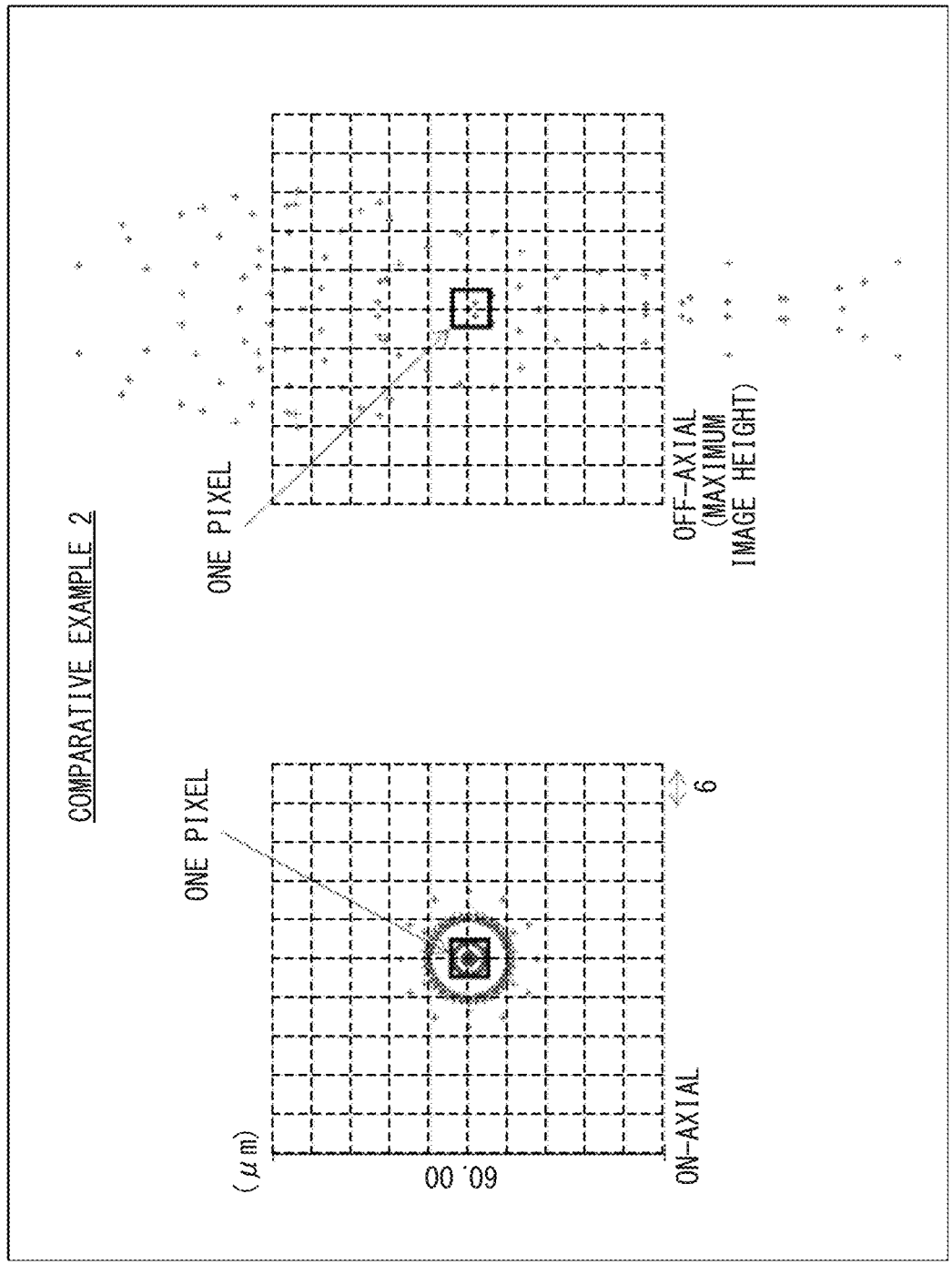
FIG. 8 is a diagram illustrating spot diagrams of the imaging optical system according to Comparative example 2 illustrated in FIG. 7.

FIG. 7 illustrates a configuration example of the imaging optical system 202 according to Comparative example 2. Compared with the configuration of the imaging optical system 1 according to the present embodiment, in the imaging optical system 202 according to Comparative example 2, the image-plane-side lens surface of the first lens L includes a spherical surface.

Table 3 and Table 4 describe lens data of application of specific numerical values to the imaging optical system 202 according to Comparative example 2 illustrated in FIG. 7. In the lens data described in Table 3 and Table 4, an object-side lens surface (the third surface) of the first lens L and both surfaces (the seventh surface and the eighth surface) of the third lens L3 each have an aspherical shape. The value of k in Expression (A) representing the aspherical shape is described in Table 3. Table 4 describes the aspherical surface coefficients $\alpha 1$, $\alpha 2$, and so on of respective orders.

TABLE 3

| | | | | | | | |
|---|---|---|---|---|---|---|---|
| Comparative example 2 | | | | | | | |
| Si | Type | Ri | Di | Ndi | vdi | k | Element |
| Sobj | | Infinity | 2.00 | | | 0 | |
| 1 | | Infinity | 2.25 | 1.5481 | 45.82 | 0 | LF |
| 2 | | Infinity | 14.35 | | | 0 | |
| 3 | Aspherical | 65.49 | 4.90 | 1.8017 | 40.73 | −20.92 | L1 |
| 4 | Spherical | −12.85 | 15.00 | | | 0 | |
| 5(STO) | Spherical | −6 | 6.00 (D(L2)) | 1.8467 | 23.78 | 0 | L2 |
| 6 | Spherical | −6.5 | 0.20 | | | 0 | |
| 7 | Aspherical | 4.77 | 4.00 (D(L3)) | 1.8507 | 40.38 | −7.683 | L3 |
| 8 | Aspherical | 5.19 | 2.80 | | | −6.92 | |
| 9 | | Infinity | 0.50 | 1.5168 | 64.17 | 0 | CG |
| 10 | | Infinity | 0.70 | | | 0 | |
| Simg | | Infinity | | | | 0 | |

TABLE 4

Comparative example 2

| | Si | | |
|---|---|---|---|
| | 3 | 7 | 8 |
| α1 | 0 | 0 | 0 |
| α2 | −0.0002004 | 0 | 5.99E−03 |
| α3 | 1.1402E−06 | 6.41E−03 | −4.00E−04 |
| α4 | 0 | −3.72E−04 | 0 |
| α5 | 0 | 1.52E−05 | 0 |
| α6 | 0 | −2.97E−07 | 0 |
| α7 | 0 | 0 | 0 |

FIG. 7 illustrates an on-axial spot diagram and an off-axial (maximum image height) spot diagram of the imaging optical system 202 according to Comparative example 2. The imaging optical system 202 is provided as an optical system that detects infrared light. FIG. 7 illustrates spot diagrams in a case where ray tracing is performed with light having a wavelength of 785 nm for a case where the numerical values described in Tables 3 and 4 are applied.

As can be appreciated from FIG. 7, in a case of the imaging optical system 202 according to Comparative example 2 in which the image-plane-side lens surface of the first lens L1 is spherical, a relatively-favorable image formation performance is obtained in the on-axial region; however, a sufficient image formation performance is not obtainable in the off-axial region because the image plane is tilted. In contrast, in the imaging optical system 1 according to the present embodiment, the first lens L1 has the aspherical shape optimized as Condition 1 described above. As a result, an image formation performance in the off-axial region is improved, as can be appreciated from FIG. 5.

(Workings and Effects of Optimizing Thickness of Second Lens L2 (Condition 2))

The imaging optical system 1 according to the present embodiment satisfies Condition 2 described above, thereby allowing the second lens L2 to be a thick meniscus lens that has a thickness greater than that of the third lens L3. In the imaging optical system 1, the thickness of the second lens L2 allows for a difference between a refractive angle of an on-axial light ray passing through the second lens L2 and a refractive angle of an off-axial light ray passing through the second lens L2. In a case where the thickness of the second lens L2 is small, a light exit surface of the second lens L2 is closer to a light entrance surface, preventing to allow for an appropriate difference between the refractive angle of the on-axial light ray and the refractive angle of the off-axial light ray. Accordingly, it is difficult to obtain a favorable image formation performance in the on-axial region and the off-axial region. Consequently, in a case where the thickness of the second lens L2 is made smaller as in the imaging optical system 203 according to Comparative example 3 illustrated in FIG. 9 below, a favorable image formation spot is not obtainable either in the on-axial region or the off-axial region (FIG. 10).

Figure 9:
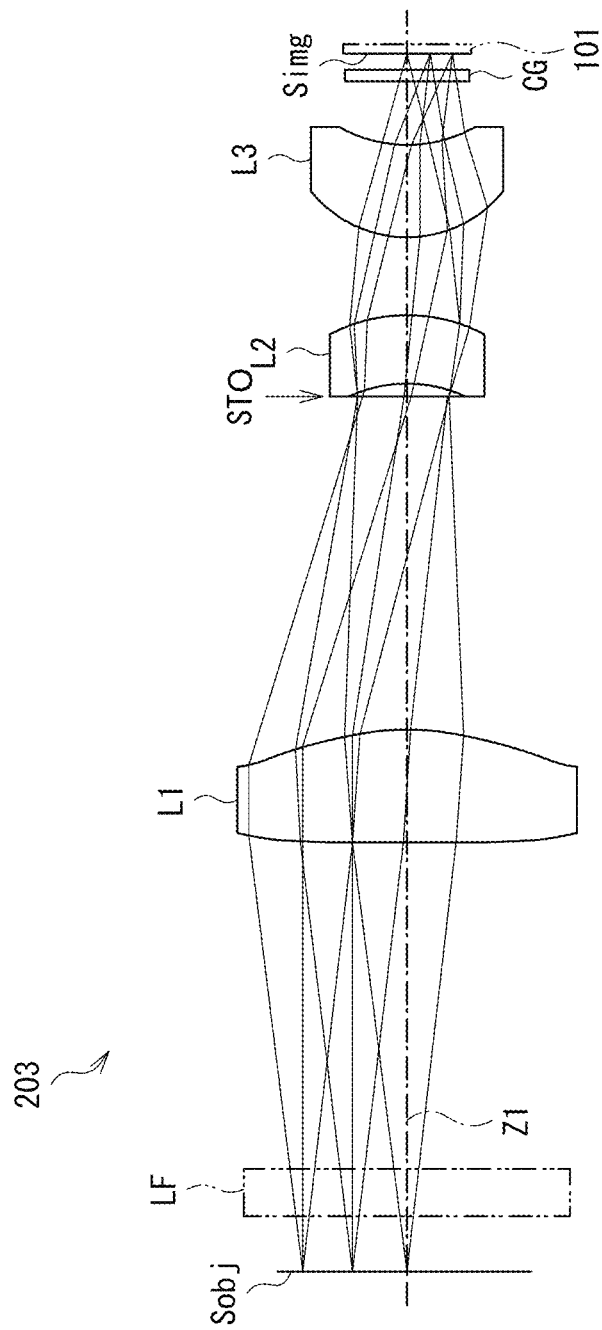
FIG. 9 is an optical-system cross-sectional view of a configuration example of an imaging optical system according to Comparative example 3.
Figure 10:
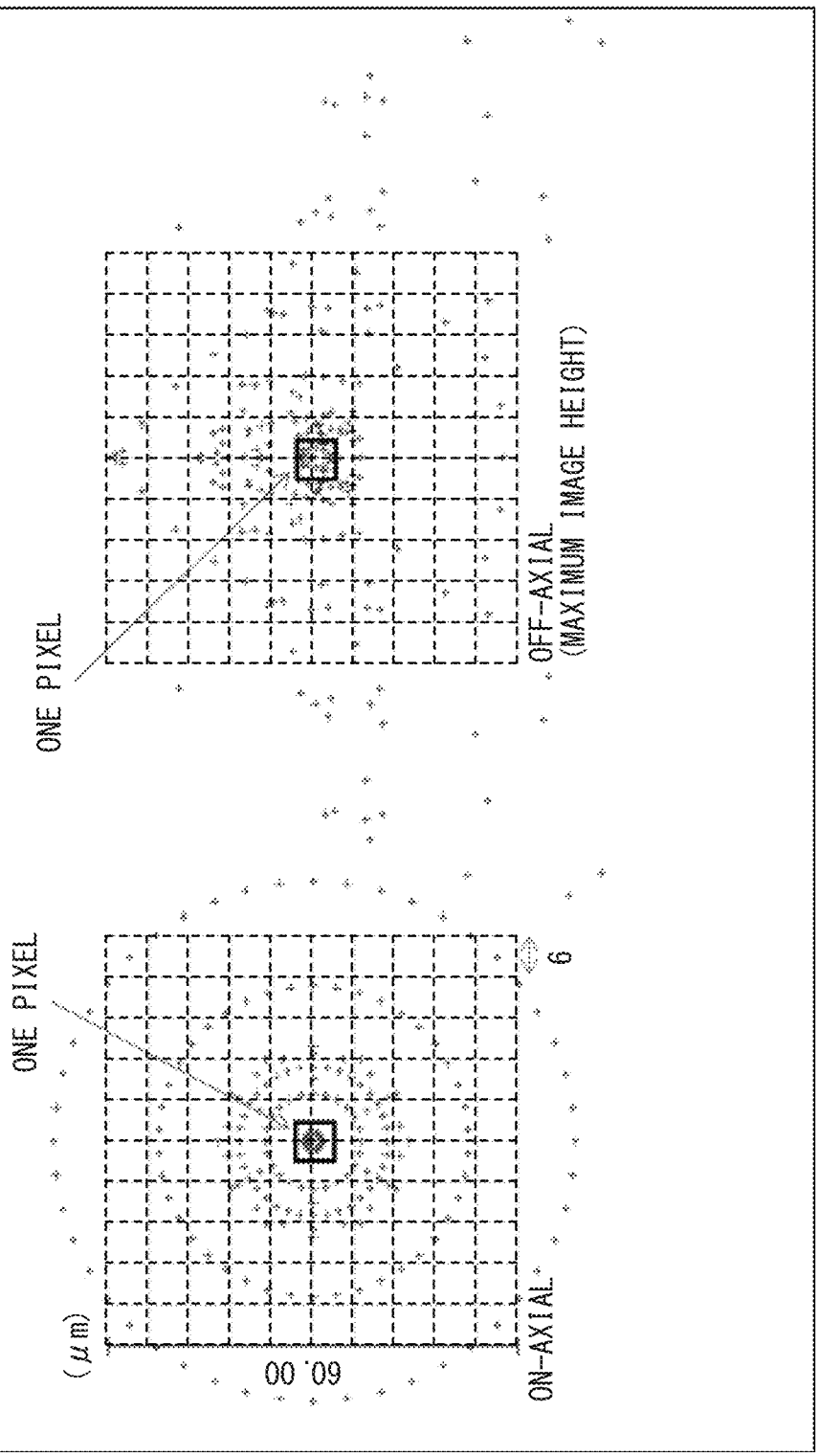
FIG. 10 is a diagram illustrating spot diagrams of the imaging optical system according to Comparative example 3 illustrated in FIG. 9.

FIG. 9 illustrates a configuration example of the imaging optical system 203 according to Comparative example 3. Compared with the configuration of the imaging optical system 1 according to the present embodiment, the imaging optical system 203 according to Comparative example 3 does not satisfy Condition 2 descried above, including the second lens L2 that is a meniscus lens with a thickness smaller than that of the third lens L3.

Table 5 and Table 6 describe lens data of application of specific numerical values to the imaging optical system 203 according to Comparative example 3 illustrated in FIG. 9. In the lens data described in Table 5 and Table 6, both object-side lens surfaces (the third surface and the fourth surface) of the first lens L1 and both surfaces (the seventh surface and the eighth surface) of the third lens L3 each have an aspherical shape. The value of k in Expression (A) representing the aspherical shape is described in Table 5. Table 6 describes the aspherical surface coefficients α1, α2, and so on of respective orders.

TABLE 5

Comparative example 3

| Si | Type | Ri | Di | Ndi | νdi | k | Element |
|---|---|---|---|---|---|---|---|
| Sobj | | Infinity | 2.00 | | | 0 | |
| 1 | | Infinity | 2.25 | 1.5481 | 45.82 | 0 | LF |
| 2 | | Infinity | 14.35 | | | 0 | |
| 3 | Aspherical | −678.06 | 4.90 | 1.8017 | 40.73 | 7125.49 | L1 |
| 4 | Aspherical | −11.93 | 15.00 | | | −3.5483 | |
| 5 (STO) | Spherical | −6.34 | 3.00 (D(L2)) | 1.8467 | 23.78 | 0 | L2 |
| 6 | Spherical | −6.5 | 3.30 | | | 0 | |
| 7 | Aspherical | 4.508 | 4.00 (D(L3)) | 1.8507 | 40.38 | −7.1665 | L3 |
| 8 | Aspherical | 5.19 | 2.80 | | | −6.92 | |
| 9 | | Infinity | 0.50 | 1.5168 | 64.17 | 0 | CG |
| 10 | | Infinity | 0.70 | | | 0 | |
| Simg | | infinity | 0.00 | | | 0 | |

TABLE 6

Comparative example 3

| | Si | | | |
|---|---|---|---|---|
| | 3 | 4 | 7 | 8 |
| α1 | 0 | 0 | 0 | 0 |
| α2 | 0.000132 | −3.80E−05 | 0.007406266 | 5.99E−03 |
| α3 | 5.48E−07 | 2.05E−06 | −5.32E−04 | −4.00E−04 |
| α4 | 0 | −4.66E−09 | 2.73E−05 | 0 |
| α5 | 0 | 0 | −6.11E−07 | 0 |
| α6 | 0 | 0 | 0 | 0 |
| α7 | 0 | 0 | 0 | 0 |

FIG. 10 illustrates an on-axial spot diagram and an off-axial (maximum image height) spot diagram of the imaging optical system 203 according to Comparative example 3. The imaging optical system 203 is provided as an optical system that detects infrared light. FIG. 10 illustrates spot diagrams in a case where ray tracing is performed with light having a wavelength of 785 nm for a case where the numerical values described in Tables 5 and 6 are applied.

(Workings and Effects of Optimizing Orientations of Meniscus Shapes of Second Lens L2 and Third Lens L3 (Condition 3))

In a case where the second lens L2 and the third lens L3 do not have the respective meniscus lens oriented in directions opposite from each other, it is difficult to obtain a favorable image formation performance even if other design parameters are optimized.

2. Second Embodiment

Next, a second embodiment of the present disclosure is described. Note that, in the following, the same reference numerals are given to substantially the same components as those of the imaging optical system and the imaging apparatus according to the first embodiment described above, and a description thereof will be omitted where appropriate.

Figure 11:
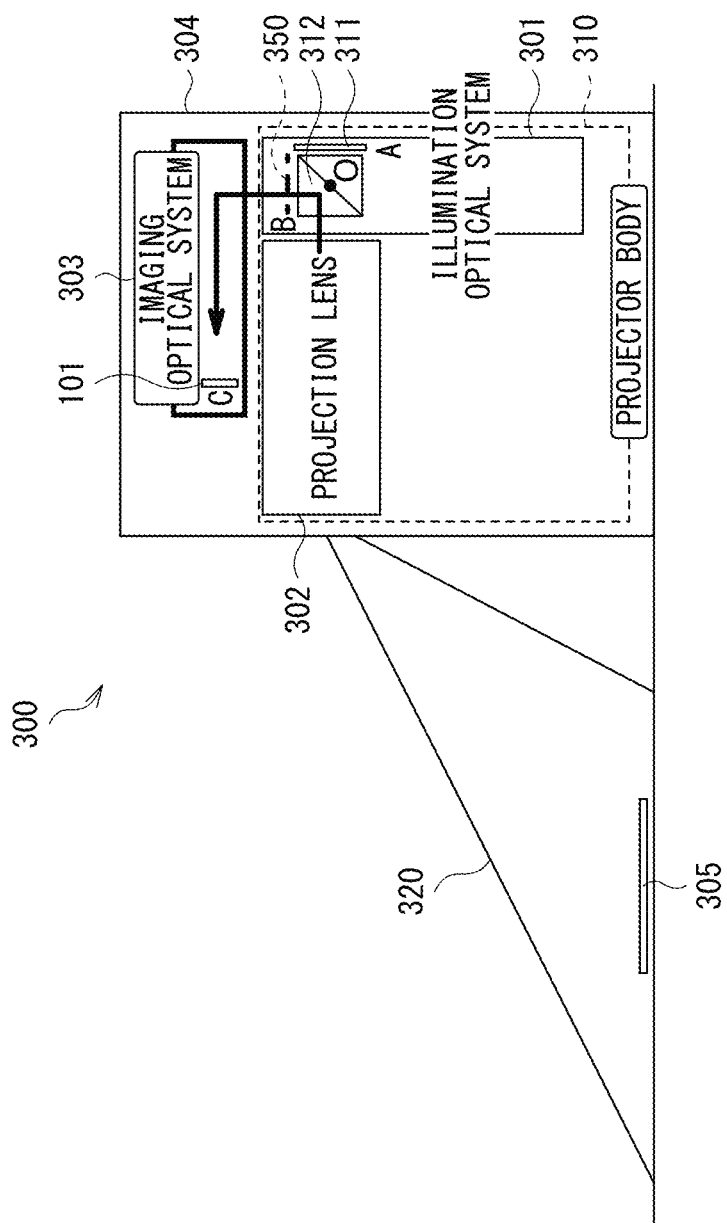
FIG. 11 is a configuration diagram illustrating a configuration example of a projector according to a second embodiment.

FIG. 11 illustrates a configuration example of a projector 300 according to the second embodiment. The imaging optical system 1 and the imaging apparatus according to the first embodiment described above are applicable to the projector 300 with an image detection function having the configuration illustrated in FIG. 11, etc., for example.

Note that the imaging optical system 1 and the imaging apparatus according to the first embodiment described above are applicable, not only to the projector 300 with the image detection function, but also to a relay optical system or the like of another device or another system. For example, they are applicable to a relay optical system or the like in an industrial endoscope, etc. In this case, the F-number of the imaging optical system 1 is not necessarily less than 6.

The projector 300 illustrated in FIG. 1I contains a projector body 310 and an imaging optical system 303 in a housing 304. The imaging optical system 1 according to the first embodiment described above is applicable as the imaging optical system 303. Disposed on an image-formation plane of the imaging optical system 303 is the imaging device 101.

Further, the projector 300 may also include an infrared light source that applies image-detection-dedicated infrared light.

The projector body 310 includes an illumination optical system 301 and a projection lens 302. The illumination optical system 301 illuminates a light valve 311. The projection lens 302 projects an image formed by the light valve 311.

The illumination optical system 301 includes an unillustrated light source device and a polarizing beam splitter 312. The light valve 311 is illuminated by illumination light emitted from the unillustrated light source device via the polarizing beam splitter 312.

The light valve 311 modulates the illumination light on the basis of image data to generate image light. The image light generated by the light valve 311 is projected onto a projection surface via the polarizing beam splitter 312 and the projection lens 302.

The projector 300 has a function of acquiring an image of a detected object 305 disposed in a region illuminated by projection light 320 from the projection lens 302. The projection lens 302 has a function adapted to project an image, and also has a function as an image formation optical system adapted to perform image detection. The projection lens 302 forms an image of the detected object 305 on a conjugate plane 350 as a primary image-formation image.

In the projector 300, light taken in from the detected object 305 via the projection lens 302 is reflected by the polarizing beam splitter 312 in a direction different from that toward the illumination optical system 301, and the reflected light is detected by the imaging optical system 303.

In the projector 300, a position A of the light valve 311 and a position of the detected object 305 are in an optically-conjugate relationship. Further, the detected object 305 and a position B (the conjugate plane 350) are also in an optically-conjugate relationship. The position B is at a position that has a distance OB from a middle point O of the polarizing beam splitter 312. The distance OB is equal to a distance OA that is from the middle point O of the polarizing beam splitter 312 to the light valve 311. Therefore, if the imaging device 101 is allowed to be disposed at the position B, it is possible to perform imaging of the detected object 305. However, in practice, such a place is often taken by another optical device or the like, making it difficult to dispose the imaging device 101 in such a manner in many cases.

To address this, the imaging optical system 303 including the bi-telecentric relay optical system proposed as the technology of the present disclosure is used to guide again the secondary image-formation image to a position C. The position B (the conjugate plane 350) corresponds to the object plane Sobj (the primary image-formation plane) in FIG. 4. The position C at which the primary image-formation image formed at the position B is relayed to the imaging device 101 by the imaging optical system 303 corresponds to the image plane Simg (the secondary image-formation plane) in FIG. 4.

In the projector 300, the object image is relayed by the imaging optical system 303 including minimum number of lenses, and the object image is reduced, in a limited space. This allows for reduction in size of the imaging device 101. Providing the configuration proposed in the technology of the present disclosure to the imaging optical system 303 makes it possible to obtain an image formation performance suitable for an image detection purpose. Further, as the imaging device 101, it is possible to adopt an imaging device developed specifically for a telecentric optical system.

3. Other Embodiments

The technology according to the present disclosure is not limited to the above description of each of the embodiments, and various modifications can be made.

For example, the shapes and the numerical values of the respective parts described in Example above are mere examples of implementation for carrying out the present technology, and the technical scope of the present technology should not be construed as being limited by these examples.

Further, in the above-described embodiments and the above-described Example, the configuration substantially including three lenses has been described; however, a configuration may be adopted that further includes a lens having substantially no refractive power.

For example, the present technology may also have the following configurations.

According to the present technology having the following configurations, the three-lens configuration is provided as a whole, and the configuration of each of the lenses is optimized. As a result, it is possible to provide an imaging optical system or an imaging apparatus that is small in size and superior in image formation performance.

(1)

An imaging optical system including:

a first lens that includes an image-plane-side lens surface having an aspherical shape with an inflection point;

a second lens that has a meniscus shape including a concave surface toward object side; and a third lens that has a meniscus shape including a concave surface toward image plane side, the first lens, the second lens, and the third lens being disposed in order from the object side toward the image plane side, the imaging optical system being provided as a bi-telecentric optical system.

(2)

The imaging optical system according to (1) described above, in which $$D(L2)>D(L3)$$

is satisfied where D(L2) is a thickness of the second lens on an optical axis, and D(L3) is a thickness of the third lens on the optical axis.

(3)

The imaging optical system according to (1) or (2) described above, in which the first lens, the second lens, and the third lens each have positive refractive power in vicinity of an optical axis.

(4)

The imaging optical system according to any one of (1) to (3) described above, in which the image-plane-side lens surface of the first lens has an aspherical shape that is convex toward the image plane side at a center part and gradually becomes concave in a direction toward a peripheral part.

(5)

The imaging optical system according to any one of (1) to (4) described above, in which F-number is less than 6.

(6)

The imaging optical system according to any one of (1) to (5) described above, in which an aperture stop is provided in vicinity of an object-side lens surface of the second lens.

(7)

The imaging optical system according to any one of (1) to (6) described above, in which an imaging device is disposed on the image plane side, and the imaging optical system is provided as an optical system that relays a primary image-formation image onto an imaging surface of the imaging device as a secondary image-formation image, the primary image-formation image being formed on the object side.

(8)

The imaging optical system according to (7) described above, in which the primary image-formation image is an image formed by infrared light.

(9)

An imaging apparatus including:

an imaging optical system; and an imaging device that outputs an imaging signal based on an optical image formed by the imaging optical system, the imaging optical system including a first lens that includes an image-plane-side lens surface having an aspherical shape with an inflection point, a second lens that has a meniscus shape including a concave surface toward object side, and a third lens that has a meniscus shape including a concave surface toward image plane side, the first lens, the second lens, and the third lens being disposed in order from the object side toward the image plane side, the imaging optical system being provided as a bi-telecentric optical system.

(10)

The imaging apparatus according to (9) described above, in which the imaging optical system is an optical system that relays a primary image-formation image onto an imaging surface of the imaging device as a secondary image-formation image, the primary image-formation image being formed on the object side.

(11)

The imaging apparatus according to (10) described above, further including an image-formation optical system that forms an image of a detected object as the primary image-formation image, in which the imaging device performs imaging of the detected object via the image-formation optical system and the imaging optical system.

The present application claims priority based on Japanese Patent Application No. 2018-058370 filed with the Japan Patent Office on Mar. 26, 2018, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

What is claimed is:

1. An imaging optical system comprising:
   a first lens that includes a lens surface having an aspherical shape with an inflection point toward an image plane side;
   a second lens that has a meniscus shape including a concave surface toward an object side; and
   a third lens that has a meniscus shape including a concave surface toward the image plane side,
   wherein respective meniscus shapes of the second lens and the third lens are oriented in directions opposite to each other,
   wherein a convex surface of the second lens faces a convex surface of the third lens,
   wherein the second lens has a positive refractive power,
   wherein the first lens, the second lens, and the third lens are disposed in order from the object side toward the image plane side,
   wherein an imaging device is disposed on the image plane side,
   wherein the imaging device includes a microlens and a light-receiving region, and
   wherein light is condensed in each pixel in both an on-axial region and an off-axial region without shifting pixels.

2. The imaging optical system according to claim 1, wherein $D(L2)>D(L3)$ is satisfied where $D(L2)$ is a thickness of the second lens on an optical axis, and $D(L3)$ is a thickness of the third lens on the optical axis.

3. The imaging optical system according to claim 1, wherein the first lens, the second lens, and the third lens each have positive refractive power in a vicinity of an optical axis.

4. The imaging optical system according to claim 1, wherein the first lens has an aspherical shape that is convex toward the image plane side at a center part and gradually becomes concave in a direction toward a peripheral part.

5. The imaging optical system according to claim 1, wherein F-number is less than 6.

6. The imaging optical system according to claim 1, wherein an aperture stop is provided in a vicinity of an object-side lens surface of the second lens.

7. The imaging optical system according to claim 1, wherein the imaging optical system is provided as an optical system that relays a primary image-formation image onto an imaging surface of the imaging device as a secondary image-formation image, the primary image-formation image being formed on the object side.

8. The imaging optical system according to claim 7, wherein the primary image-formation image is an image formed by infrared light.

9. An imaging apparatus comprising:
an imaging optical system; and
an imaging device that outputs an imaging signal based on an optical image formed by the imaging optical system,
the imaging optical system including:
a first lens that includes a lens surface having an aspherical shape with an inflection point toward an image plane side,
a second lens that has a meniscus shape including a concave surface toward an object side, and
a third lens that has a meniscus shape including a concave surface toward the image plane side,
wherein respective meniscus shapes of the second lens and the third lens are oriented in directions opposite to each other,
wherein a convex surface of the second lens faces a convex surface of the third lens,
wherein the second lens has a positive refractive power,
wherein the first lens, the second lens, and the third lens are disposed in order from the object side toward the image plane side,
wherein an imaging device is disposed on the image plane side,
wherein the imaging device includes a microlens and a light-receiving region, and
wherein light is condensed in each pixel in both an on-axial region and an off-axial region without shifting pixels.

10. The imaging apparatus according to claim 9, wherein the imaging optical system is an optical system that relays a primary image-formation image onto an imaging surface of the imaging device as a secondary image-formation image, the primary image-formation image being formed on the object side.

11. The imaging apparatus according to claim 10, further comprising:
an image-formation optical system that forms an image of a detected object as the primary image-formation image,
wherein the imaging device performs imaging of the detected object via the image-formation optical system and the imaging optical system.

* * * * *